United States Patent [19]

Davidow

[11] Patent Number: 5,611,556
[45] Date of Patent: Mar. 18, 1997

[54] SPEED CHANGE MECHANISM

[76] Inventor: Robert P. Davidow, 2814 Lee Oaks Pl., #102, Falls Church, Va. 22046

[21] Appl. No.: 436,971

[22] Filed: May 8, 1995

[51] Int. Cl.$^6$ ........................................................ F16H 3/08
[52] U.S. Cl. ............................ 280/236; 280/238; 74/372
[58] Field of Search .................................. 280/236, 238; 74/370, 372; 474/77, 78, 80

[56] References Cited

U.S. PATENT DOCUMENTS

| | | |
|---|---|---|
| 356,095 | 1/1887 | Bouck . |
| 476,157 | 5/1892 | Moore et al. . |
| 509,122 | 11/1893 | Faussereau . |
| 528,954 | 11/1894 | Lippy et al. . |
| 528,956 | 11/1894 | Lippy et al. . |
| 575,725 | 1/1897 | Meister . |
| 625,835 | 6/1899 | Davis . |
| 626,257 | 6/1899 | Whipple . |
| 645,446 | 3/1900 | Adams . |
| 881,729 | 3/1908 | Smith . |
| 1,388,102 | 8/1921 | Doose . |
| 2,210,221 | 1/1938 | Sperry . |
| 2,426,835 | 9/1947 | Mahler ............................ 74/372 X |
| 2,588,047 | 9/1949 | Riga et al. . |
| 3,572,569 | 3/1971 | Metzger . |
| 3,873,128 | 3/1975 | Dunder et al. . |
| 4,813,302 | 3/1989 | Davidow ........................ 280/238 X |
| 5,292,286 | 3/1994 | Lan . |
| 5,404,768 | 4/1995 | Hwang et al. ................... 74/372 X |

FOREIGN PATENT DOCUMENTS

| | | | |
|---|---|---|---|
| 1500488 | 7/1969 | Germany ................................. 74/372 |
| 427107 | 11/1947 | Italy ....................................... 280/238 |
| 191395 | 6/1937 | Switzerland ............................ 74/372 |

*Primary Examiner*—Kevin Hurley
*Assistant Examiner*—Victor E. Johnson
*Attorney, Agent, or Firm*—Kerkam, Stowell, Kondracki & Clarke P.C.; John C. Kerins

[57] ABSTRACT

A speed change mechanism, principally for use on a bicycle, is provided in which a plurality of driving gears and an associated plurality of driven gears are coupled by a plurality of drive chains, such that each driving gear and its associated driven gear form a gear pair, with each gear pair providing a different input-to-output drive ratio. The driving gears are fixedly mounted to a driving shaft that is operatively coupled to a power input, such as a pedal and crank assembly of a bicycle, and the driven gears are rotatably disposed around a driven hub, with means provided for shifting between and engaging one of the driven gears to the driven shaft, with the driven shaft further operatively coupled to an output gear that will transmit power to a rear wheel of a bicycle, for example.

17 Claims, 8 Drawing Sheets

SPEED CHANGE MECHANISM

BACKGROUND OF THE INVENTION

1. Field of the Invention

The present invention relates to a speed or gear-changing mechanism that can be operated while a device is either in a kinetic or a static condition. More specifically, the invention relates to a speed or gear changing mechanism in which a plurality of paired gears having different gear ratios are employed in a relatively simple construction that has particular application in relatively light power transmitting circumstances such as a drive arrangement in a bicycle.

2. Description of Related Art

Speed changing mechanisms currently used in bicycles are a specific area in which the complexity of the mechanisms lead to serious drawbacks in operation, maintenance, the cost of the original equipment, and the repair and replacement of components. The more popular touring, mountain, and racing bicycles employ multiple-speed gearing and shifting mechanisms, including sixteen speed, twenty-one speed, and even twenty-four speed mechanisms, that almost universally employ both front and rear derailleurs. The front and rear derailleurs are employed to change between generally two or three front drive gears and generally seven or eight rear driven gears. The drive gears and driven gears are coupled by a single drive chain that engages one front and one rear sprocket gear at any given time, and the drive chain must be physically moved by the derailleurs to other sprocket gears when changing speeds.

Speed-change mechanisms based upon the use of derailleurs involve the use of many component parts, and have proven to be very sensitive, both in the area of properly operating the shift levers to obtain the desired drive-to-driven gear ratio, and in the area of maintenance of the system, including the adjustment of the shift levers, cabling and positioning of the derailleur components that engage the drive chain to move it between adjacent gears. Shift indexers have been employed in an attempt to avoid the common problem of the bicycle rider overshifting or undershifting, wherein the transition of the drive chain from a current position to engagement with a different desired gear is not effected smoothly and on a first attempt. However, shift indexers add to the overall complexity of the system, and must rely on the proper positioning, during initial assembly and after any subsequent reassembly, of the front and rear derailleurs and their installation on the bicycle. Further, the tightened tolerances in an indexed system make it very difficult for non-experts to perform any maintenance or repair work on the speed changing system.

A further disadvantage of derailleur-based speed changing mechanisms is that the gear ratio between the drive and driven gears can be changed only while the bicycle is in motion, thus preventing a speed change in a stopped or static condition. At this juncture, it may be helpful to note that the gear ratios are usually not specifically referred to as such, rather, those gear ratios are responsible for effecting changes in the "gear" (e.g., first gear, second gear, and so on). The term "speed" is also used in the context of the bicycle having sixteen, twenty-one, or twenty-four "speeds". With the ever-increasing use of bicycles in recreational uses, and by less experienced riders, the ability to change speeds while stationary is seen as being highly advantageous. Along the same lines, the need for a highly reliable and accurate mechanism that will repeatedly effect the speed changes desired, without the sort of trial and error involved in moving shift levers in a derailleur-based system to obtain the desired gear ratio, is of increasing importance.

The ability to more readily customize a speed changing mechanism to provide a desired set of specific gear ratios or speeds on a rider-by-rider basis is also desirable, given the wide range of riding experience, physical condition, and general athletic ability encountered in the bicycle-riding community. This capability is likely to be limited in derailleur-based systems, in that adjacent gears in the drive gear set and adjacent gears in the driven gear set generally have to be relatively close in size to allow the drive chain to be easily moved from one gear to the next.

An additional drawback of current derailleur-based speed changing mechanisms is in the shift mechanism employed to effect the selection of a desired speed. In the systems employing both front and rear derailleurs, two separate shift levers are used, and frequently are designed and installed on the bicycle such that shifting to a smaller sprocket on both the front and rear derailleur involves moving the shift levers in the same direction. However, moving to a smaller sprocket on the front derailleur has the opposite effect (decreasing drive ratio) of moving to a smaller sprocket on the rear derailleur (increasing drive ratio). This shift pattern can cause confusion to the rider in determining what shifting action needs to be effected in order to bring about the desired speed change. It is also often difficult for the rider to remember whether the "speed" currently in use involves engagement of one of the exterior sprockets on the front or rear gearset. Particularly in view of the fact that it is possible to shift the drive chain completely off of a front or rear gearset in a derailleur system, thereby disengaging the chain and disabling the drive mechanism, the complexity of the shift pattern is a significant problem.

Speed changing mechanisms that avoid the use of derailleurs have previously been disclosed in the art, including the mechanism shown in U.S. Pat. No. 4,813,302, issued to the inventor in the present application. That speed change mechanism avoids entirely the use of a drive chain coupling a drive gear to a driven gear in propelling the bicycle. Two variations on another mechanism that employs the use of two pairs of sprocket gears having each gear pair coupled by a dedicated sprocket chain are disclosed in two U.S. patents (U.S. Pat. No. 528,954 and U.S. Pat. No. 528,856) issued to Lippy et al. The design of those systems, including the shifting and gear pair engagement or clutch mechanisms, effectively limit those devices to use in providing two available speeds to the bicycle rider. At the present time, there is little, if no, use for a speed changing mechanism of the type disclosed in these Lippy et al. patents, as those provide only two different speeds, and there are currently available much more effective and reliable three-speed shifting mechanisms in which only a single drive chain is used, and the gear ratio change is effected internally in the hub of the rear wheel of the bicycle. Even with the relative simplicity, reliability and availability of three-speed changers, the overwhelming demand among bicyclists aged from the early teens through adulthood is for bicycles that provide a number of different speeds in excess of three, and generally no less than five different speeds.

The use of a gear train including a plurality of spur gear pairs selectable by the shifting of an intermediate gear to mesh with a desired gear pair has also been proposed. Such all-gear transmissions or power trains are inefficient as compared to sprocket gear and sprocket chain systems, and thus are generally undesirable for use on bicycles, as there are few, if any, advantages provided by all-gear systems, and the extra work required to achieve the same level of power output is a serious disadvantage, given that the work must be provided by the bicycle rider.

It is therefore a principal object of the present invention to provide a speed changing mechanism for a bicycle that avoids the use of a derailleur or derailleurs and the moving of a drive chain from sprocket to sprocket in order to change speeds or shift gears.

It is also an important object of the present invention to provide a speed changing mechanism that requires a minimal amount of maintenance, is capable of allowing the rider to shift gears both in dynamic and static modes, and which readily permits custom selection of gear pairs of different gear ratios to achieve the desired bicycle drive ratios suitable for a particular rider.

SUMMARY OF THE INVENTION

The above and other objects of the present invention are achieved in the present invention by providing a speed changing mechanism for a bicycle that utilizes a plurality of gear pairs having different gear ratios and a corresponding number of sprocket chains, and gear shifting means for selecting a desired gear pair to be operatively coupled into the drive train of the bicycle. The gear pairs are assembled such that there will be a drive gearset on which all sprocket gears will be operatively coupled to the pedal/crank assembly which provides the power input, and a driven gearset having the gear shifting means located within a hub of the driven gearset, and operable to selectively engage one of the driven sprocket gears to lock that gear to the hub and to drive a drive sprocket gear coupled to the rear wheel sprocket gear.

The gear pairs may be positioned at several locations on the bicycle frame, including having the drive gearset positioned on the same drive shaft that the crank arms are secured to. Alternatively, the drive gearset may be coupled to the power input by way of an additional pair of sprockets rotationally locked to the crank drive shaft and to a drive hub having the drive sprockets secured thereto.

The shifter mechanism comprises a traveler having locking tabs protruding therefrom to engage a desired driven sprocket gear, with the traveler moving within the interior of a hub around which the driven sprocket gears rotate. A shift lever is employed to pull cables extending into the hub and connected to the traveler, to move the traveler in a desired lateral direction. In one embodiment that employs a retractable tab arrangement, the shifter mechanism further employs a clutch system to provide an initial, evenly divided, tension at the ends of both cables connected to the traveler, which, in combination with a scissors linkage, operates to retract the locking pins.

BRIEF DESCRIPTION OF THE DRAWINGS

These and other features of the present invention and the attendant advantages will be readily apparent to those having ordinary skill in the art and the invention will be more easily understood from the following detailed description of the preferred embodiment taken in conjunction with the accompanying drawings wherein like reference characters represent like parts throughout the several views.

DETAILED DESCRIPTION OF THE PREFERRED EMBODIMENT

Figure 1:
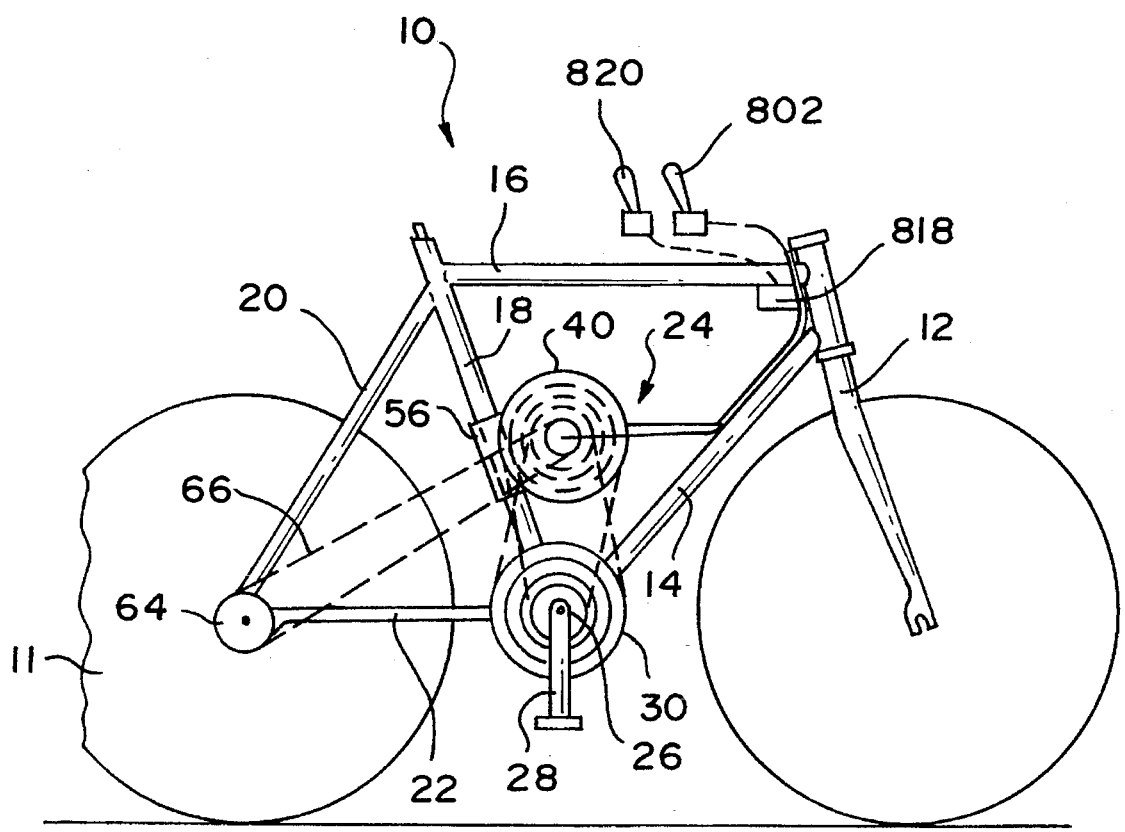
FIG. 1 is a side view of a bicycle having the speed changing mechanism of the present invention installed thereon.

Referring initially to FIG. 1, a conventional bicycle frame 10, including a front fork 12 and frame members 14, 16, 18, 20, and 22, is shown with speed changing mechanism 24 installed thereon. Frame members 14, 18, and 22 are joined together at hub 26, which has an input power source in the form of pedal and crank assembly 28 coupled thereto.

Figure 2:
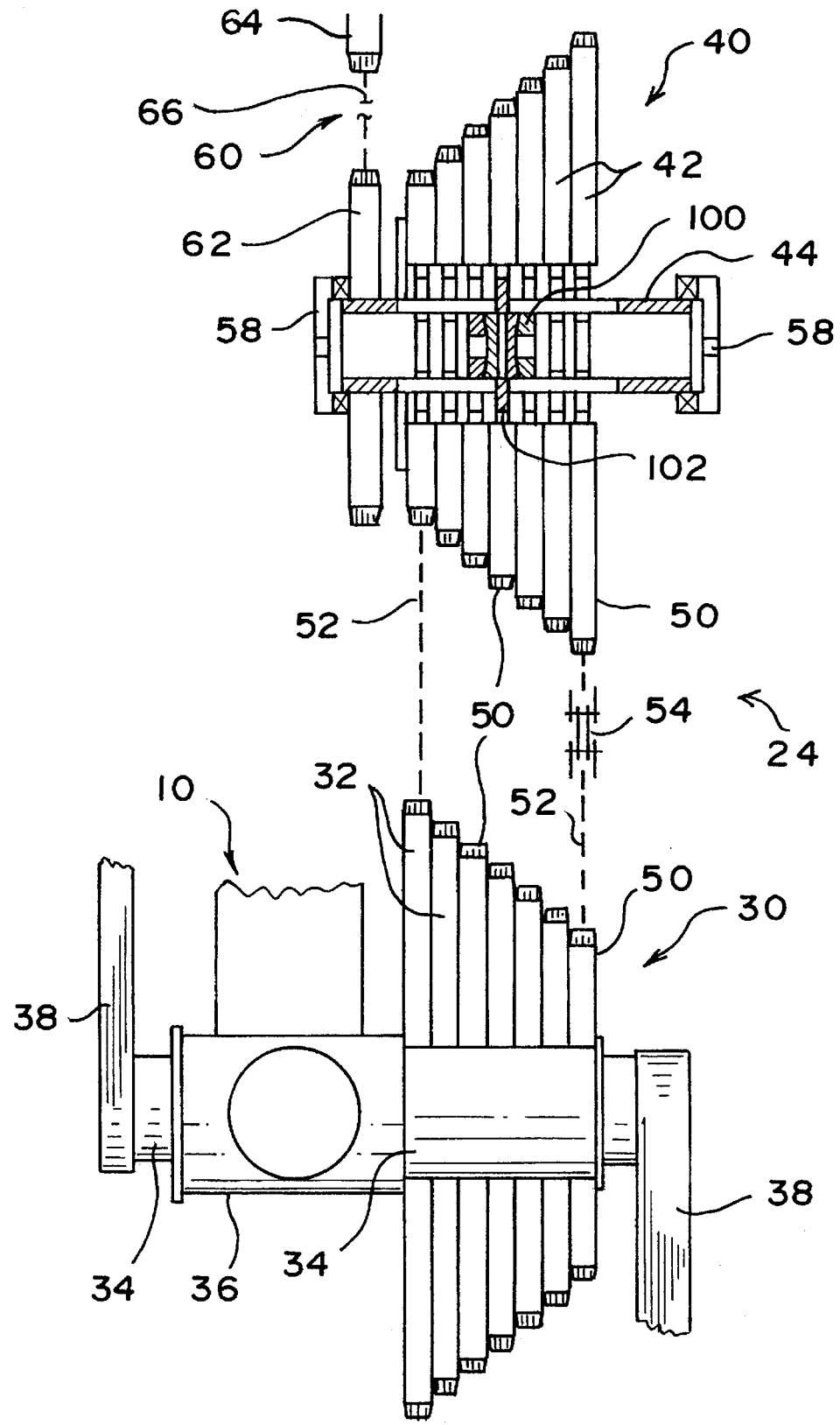
FIG. 2 is a substantially schematic partially sectional view of a preferred embodiment of the gear pairs employed in the speed change mechanism of the present invention, as viewed from the rear of the bicycle in FIG. 1.

In accordance with a preferred embodiment of the present invention, as best seen when viewing both FIG. 1 and FIG. 2, speed changing mechanism 24 includes a driving gearset 30 made up of a plurality of drive sprockets 32 of different diameters fixedly coupled to the pedal/crank assembly 28. The drive sprockets of this driving gearset 30 are secured to a portion of the drive shaft 34 protruding laterally from drive hub 36. The drive sprockets may be fixed to the drive shaft by, for example, providing keys and slots on the shaft and sprockets (not shown), as will be well understood by those in the art. Other methods of fixedly mounting these drive sprockets 32 on shaft 34 will also be suitable, for example, a fusion welding of each sprocket to the shaft would comprise one means of substantially permanently securing the drive sprockets to the shaft. The crank arms 38 are also secured to the drive shaft by conventional means, and for each full rotation of the crank arms, each and every one of drive sprockets 32 will make a complete rotation as well.

Mounted above driving gearset 30 on the bicycle frame 10 is driven gearset 40, having a plurality of driven sprockets 42 positioned to line up with the drive sprockets 32 of drive gearset 30. The driven sprockets 42 are mounted on a driven hub 44 such that they are free to rotate around the hub and independently of the hub and independently of each other, unless one of the driven sprockets is engaged or coupled to driven hub 44, in a manner that will be discussed in more detail later. Any non-engaged driven sprockets will remain in freewheel mode, as will also become apparent from the later discussion. The number of driven sprockets will be equal to the number of drive sprockets, and with the alignment of the drive and driven gearsets, each drive sprocket 32 will have a corresponding driven sprocket 42. The corresponding or associated drive and driven sprockets will be referred to herein, at times, as a gear pair 50.

As shown substantially schematically in FIGS. 1 and 2, each of the gear pairs 50 will be operatively coupled by a gear pair or sprocket chain 52, represented by dotted lines extending between each gear pair 50 made up of one drive sprocket 32 and one corresponding driven sprocket 42. As presently envisioned, the sprockets of both the drive gearset and the driven gearset will have a tooth configuration identical to that found on sprockets of bicycles on the market today, and the sprocket chains will also have the same configuration as those used on bicycles presently available on the market, having links, shown schematically in FIG. 2 by reference numeral 54, pinned together such that the adjacent links can pivot with respect to one another.

The driven gearset 40 is preferably mounted to frame member 18, also known as a seat tube, by a bracket 56, shown schematically in FIG. 1, that will be secured to seat tube 18 and to driven hub 44. The exact constructional details of bracket 56 are not critical to this invention, and thus are not described in detail, but it will be readily apparent to those skilled in the art of bicycle components and assemblies that the bracket can take different forms. In fact, as will be realized in the ensuing discussion of other preferred embodiments, it is not essential that the driven gearset be attached to the bicycle frame at the position shown in FIG. 1, and that the driven gearset may be attached at several other suitable locations, thus likely requiring various bracket configurations for the different locations.

For the particular position of the driven gearset 40 shown in FIGS. 1 and 2, it is desired that the bracket 56 include a pair of bearing assemblies, depicted substantially schematically at reference numeral 58, that will engage the driven hub 44 so as to secure its proper lateral positioning, while at the same time permitting the driven hub 44 to rotate without substantial frictional losses, as the hub is driven by a driven gear engaged with the driven hub.

In operation, as force is applied to the pedals, the crank arms 38 are rotated, which in turn rotates all of the drive sprockets 32. All of the sprocket chains 52 are thus also pulled or driven by the drive sprockets 32. The sprocket chains, being in mesh with the corresponding driven sprockets 42, cause those sprockets to rotate. The speed change mechanism operatively couples one of the gear pairs 50 to a rear wheel drive train 60, by locking the rotation of a desired driven sprocket with respect to the driven hub 44 through the use of an internal traveler 100 having locking tabs 102 extending radially outwardly through the hub to engage slots provided in each of the driven sprockets. Those driven sprockets that are not operatively locked to the driven hub simply rotate about driven hub 44 at the speed at which their corresponding sprocket chains are moving, and these driven sprockets will not transfer power to the driven hub.

The drive train 60, in the depicted preferred embodiment, comprises a driven hub sprocket gear 62 fixed to driven hub 44 such that the driven hub sprocket gear 62 is rotated by the rotation of driven hub 44. Driven hub sprocket gear 62 is operatively coupled to rear wheel sprocket gear 64 of generally standard configuration, by a further sprocket chain 66 that will also be referred to as rear wheel drive chain 66.

It is to be noted that the schematic depiction of rear wheel sprocket gear 64 and rear wheel drive chain 66 in FIG. 2 is not intended to represent the actual positioning of those components relative to the gear pairs 50, rather, the components are depicted to present a more clear understanding of the complete power transmission circuit from the rotation of the pedals and crank arms by the riders to the rear wheel of the bicycle.

It can be seen in FIG. 2 that each gear pair 50, when operatively coupled with drive train 60, provides a different gear ratio or drive ratio for transmitting power to the rear wheel. Specifically, the seven gear pairs depicted will make available seven different gear ratios, or speeds, to the bicycle rider. The speed change mechanism of the present invention avoids the use of a system, such as the derailleurs discussed in the background section, that shift a single sprocket chain among a plurality of front and rear sprockets, and instead provides a sprocket chain for each gear pair that can be selected to provide a desired gear ratio. It is recognized that this may ultimately limit, to some extent, the number of speeds that can be made available on a given bicycle, in that space and operational limitations may limit the number of gear pairs 50 that can be provided and still keep the bicycle at a manageable weight, and allow the rider to use a substantially normal pedaling action. It is believed, however, that most recreational riders will find that a bicycle having on the order of seven different speeds will perform very well, and will be well suited for their needs. Further, the speed change mechanism employing the plurality of gear pairs to change the gear ratio, and the ultimate drive ratio, can readily be designed, using basic engineering skills to select appropriately sized sprockets, to provide a wide range of gear and drive ratios.

A range of final drive ratios from about 0.85, equivalent to low gear on a mountain bike, up to about 3.7, equivalent to the highest gear on a conventional touring bike, with five intermediate drive ratios of either even or uneven intervals, could be readily achieved with appropriately sized drive sprockets and driven sprockets, making up gear pairs 50, and taking into account the drive train 60 gear ratio and the size of the bicycle wheels. This range of drive ratios, with five evenly spaced intermediate drive ratios, is presently seen to be particularly suitable for a bicycle targeted at the market of average recreational riders.

Because each of the sprocket chains 52 will be moving at a different speed, corresponding to the distance a fixed point on the circumference of its associated drive sprocket will travel per revolution (all drive gears traveling and the same number of revolutions per given time period), it is essential that the internal traveler 100 and locking tab 102 arrangement is designed such that no more than one driven sprocket is engaged at any one time. If two driven sprockets were engaged, the speed change mechanism would freeze up, as the two associated sprocket chains would attempt to rotate the hub at two different speeds.

Figure 3A:
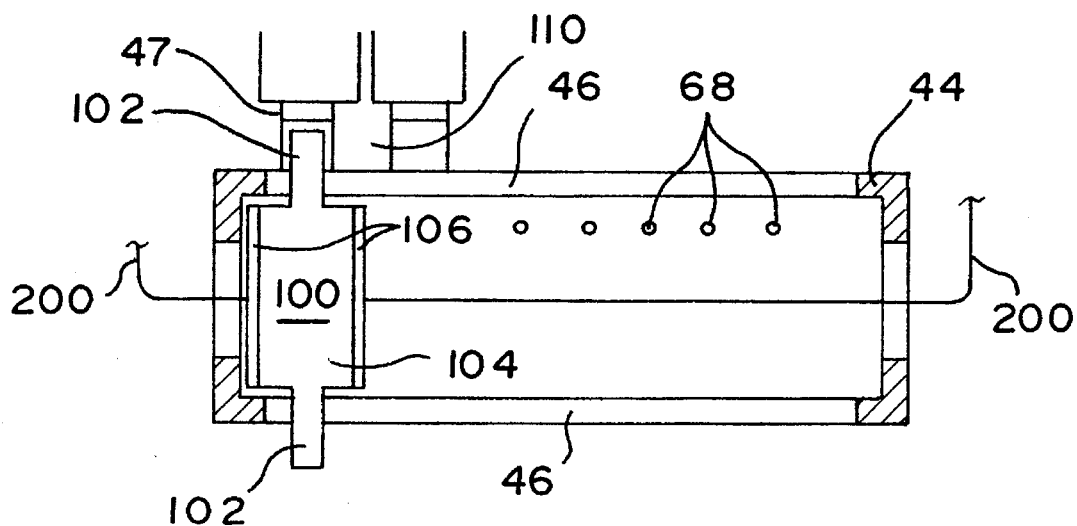
FIGS. 3A, 3B and 3C are a cross-section and two elevation views of one preferred embodiment of a traveler and locking tab construction which forms a part of the driven gearset component of the gear pairs.
Figure 3B:
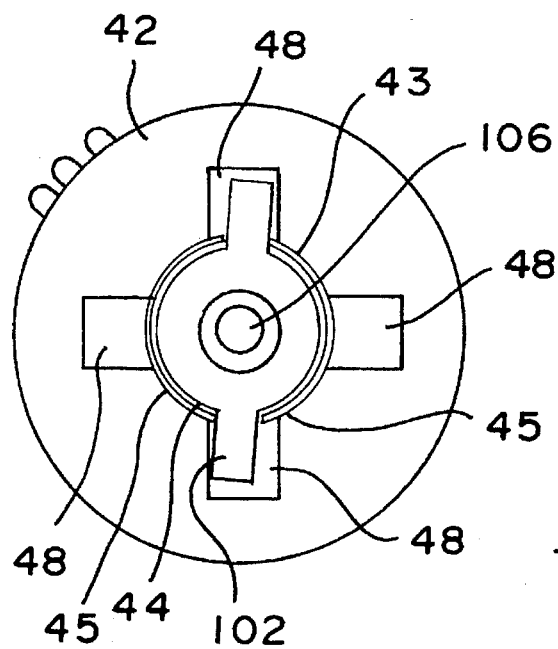
Figure 3C:
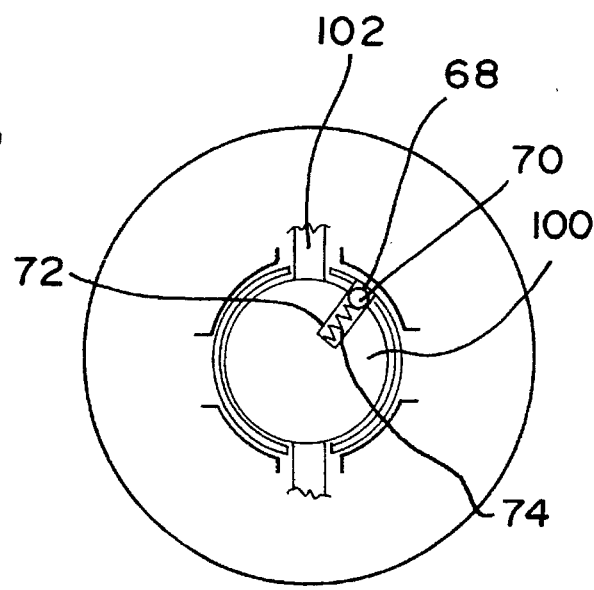

Turning now to FIGS. 3 and 4, two alternative preferred embodiments of the traveler and locking pin or tab assembly will be discussed. FIGS. 3A, 3B and 3C, in conjunction with FIG. 2, show a fixed tab embodiment of an internal traveler 100 and locking tabs 102, housed within a driven hub 44. The traveler 100 is capable of moving laterally inside hub 44, and is preferably so moved by shifting cable or cables 200. The operation of the shifting cables in effecting the lateral movement of the traveler will be discussed in greater detail later. The traveler has a cylindrical body 104 sized to have an outer diameter just slightly less than an inner diameter of the driven hub 44. Hub 44 has diametrically opposed lateral slots 46 extending the width of the driven gearset 40, through which locking tabs 102, also preferably diametrically opposed, extend when the traveler is assembled into the hub.

Traveler 100 has bearing and cable caps 106 at both ends thereof, which secure the ends of the shifting cables 200 to the traveler 100, to effectively rotationally decouple the traveler and cables such that the traveler can rotate when a driven sprocket is engaged, without twisting the cables as it rotates, which would lead to a binding up of the driven gearset and hub, and/or to a breakage of the cable or cables.

As the traveler 100 is moved laterally from one gear position to the next in the speed change operation, the fixed tabs 102 extending out of slots 46 in the hub 44 move laterally. As can be seen in FIG. 3B, each driven sprocket 42 is provided with four tab-engaging notches 48 extending radially outwardly from the center bore 43 of the sprocket and evenly spaced around the circumference of the center bore. The fixed tabs 102, upon initiation of movement of the traveler 100, will disengage from two notches in the driven sprocket of the currently selected gear pair, and will travel into a neutral zone 110 between adjacent driven sprockets, so as to ensure complete disengagement from the previously engaged sprocket before engaging an adjacent sprocket. It can be seen in FIGS. 2 and 6 that the neutral zone 110 may be created between adjacent driven gears by using sprocket gears having a reduced width in cross-section at a radially central portion 47 thereof. When the driven gears are placed adjacent to one another, the adjacent reduced width portions 47 create a space in which the tabs 102 may reside without engaging either driven gear. Alternatively, spacers 111 can be provided between adjacent gears to create a neutral zone 110 between the adjacent sprockets (see FIGS. 5A, 5B).

With continued tension being applied by the shifting cable 200, the traveler and tabs will continue to move laterally toward a position in alignment with the desired adjacent sprocket. As the desired adjacent driven sprocket 42 is being rotated by its paired drive sprocket 32 and its sprocket chain 52, a pair of notches 48 on the driven sprocket will quickly come to a position at which the tabs 102 may slide laterally into the notches in full alignment with the driven sprocket, as seen in FIG. 2.

FIG. 3B illustrates that the walls of the notches 48 of the driven sprocket 42, which sprocket continues to be rotated by virtue of its coupling to the drive sprocket of its gear pair, will engage the tabs 102, which in turn engage the lips of the lateral slots 46 in hub 44. Thus, the rotation of the driven sprocket, brought about by the rider pedaling the bicycle to rotate the drive sprocket associated with the engaged driven sprocket, will in turn rotate the driven hub, with the power transmitted being a function of the gear ratio of the drive sprocket and driven sprocket. The rotation of the hub in turn effectuates a powered rotation of the driven hub sprocket gear 62, which forms the power input of the rear wheel drive train 60, to ultimately rotate the rear wheel sprocket gear 64 and the rear wheel 11 itself.

The above description of the gear shifting demonstrates the ability to shift gears while the bicycle is being pedaled, in its dynamic condition. An important advantage of the present invention is that the speed (selected gear pair) can be changed while the bicycle is stationary, i.e., in a static condition. The lateral movement of the traveler 100 and locking tabs 102 may be effected without the need for actual pedaling of the bicycle. In a static condition, as the tabs 102 are moved laterally, the notches 48 in the adjacent driven gear 42 may be fully aligned with the locking tabs 102, in which case, the tabs 102 will slide right into place. If, however, the notches 48 are not positioned to accept the locking tabs, the pedals need be turned less than one-quarter of a revolution, in a free-wheeling direction opposite that of the power-generating direction, in order to bring the notches into a proper alignment to accept the tabs therein. As such, the static condition speed change or gear shifting will enable the rider to start off in a different speed (drive ratio) than the speed (drive ratio) at which the bicycle was set when the bicycle was stopped.

Turning back to FIG. 3B, it can also be seen that a sleeve bearing 45 may optionally be provided around hub 44, and secured to the hub by press fit, with the sleeve bearing having laterally extending slots matching those of hub 44. A low-friction material such as polytetrafluoroethylene (PTFE or Teflon®) or Delrin® may be suitable for this application. The provision of a bearing surface may be desirable from the standpoint of durability and efficiency in preventing energy losses due to friction in the system. The driven sprockets 42 spin around on bearing 45 at varying speeds when not engaged by the traveler, and even though the driven sprockets are not, at those times, carrying or transmitting a load, and even though the driven sprockets and hub are traveling in the same direction, the spinning action may create friction and cause wear on the hub. It is presently envisioned that simple lubrication of the hub surface will adequately address this problem. The sleeve bearing may further improve the situation and also, should the bearing become worn, it can be replaced without replacing the entire hub.

FIGS. 3A and 3C illustrate a further feature of the fixed tab embodiment of the traveler 100 and locking tab 102 assembly. This portion of the speed change mechanism 24 can be equipped with an indexing subassembly such that the locking tab 102 can be shifted laterally to precise locations in engaging the driven gears. As depicted, driven hub 44 is provided with a series of bores 68 extending through to the interior of the hub, with the bores being linearly arranged and spaced apart at predetermined spacings, which, if the spacing of the driven gears is even, the spacing of the bores will be even or uniform as well.

FIG. 3C illustrates that traveler 100 is provided with a spring-biased retractable ball 70 extending radially outwardly from the outer surface of the traveler. A recess 72 is provided in traveler 100 to accommodate a spring 74 and to accommodate the ball when the ball is retracted. Ball 70 and bores 68 are of a size such that ball 70 will partially, but not fully, protrude into and engage bore 68 when those elements become aligned. As traveler 100 is shifted laterally inside hub 44, ball 70 will disengage a bore that it is presently aligned with, and will retract under the radially inward force applied by the interior surface of hub 44. Thereafter, ball 70, which is retracted within recess 72 but continues to be biased outwardly, moves laterally with the traveler. When the traveler and locking tab 102 attain a position at which the tab 102 will engage a driven gear, ball 70 will encounter another of the plurality of bores 68, and will move radially outwardly to engage the bore, thus preventing further lateral movement of the traveler, unless increased lateral force is then applied to the traveler, as by applying increased force to a shift lever. As a result, the shift mechanism is provided with a positive tab indexing means that will facilitate the accurate shifting between gear pairs.

Figure 4A:
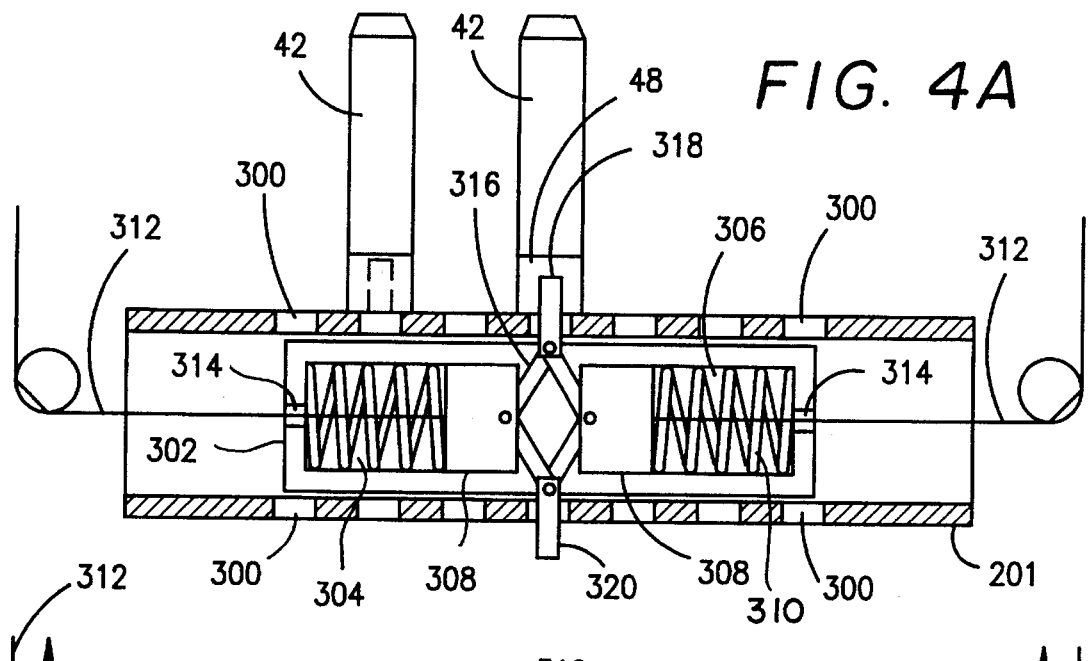
FIGS. 4A, 4B, and 4C are elevation views of a retractable tab traveler construction in accordance with a preferred embodiment of the present invention.
Figure 4B:
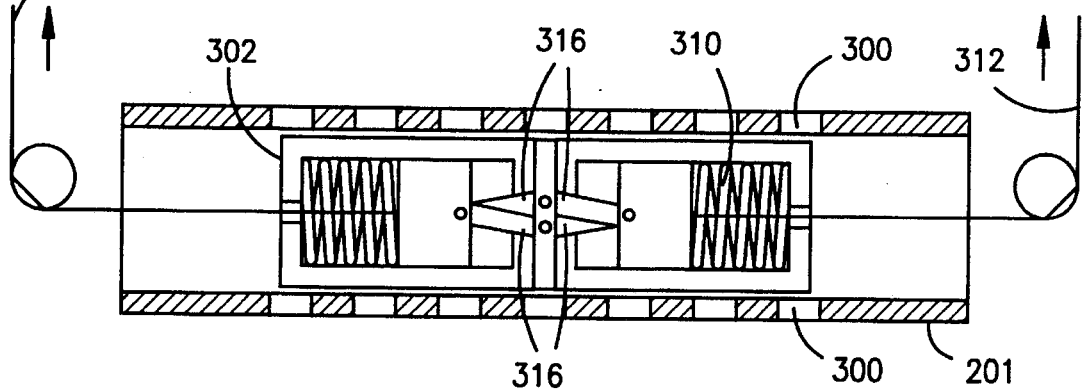
Figure 4C:
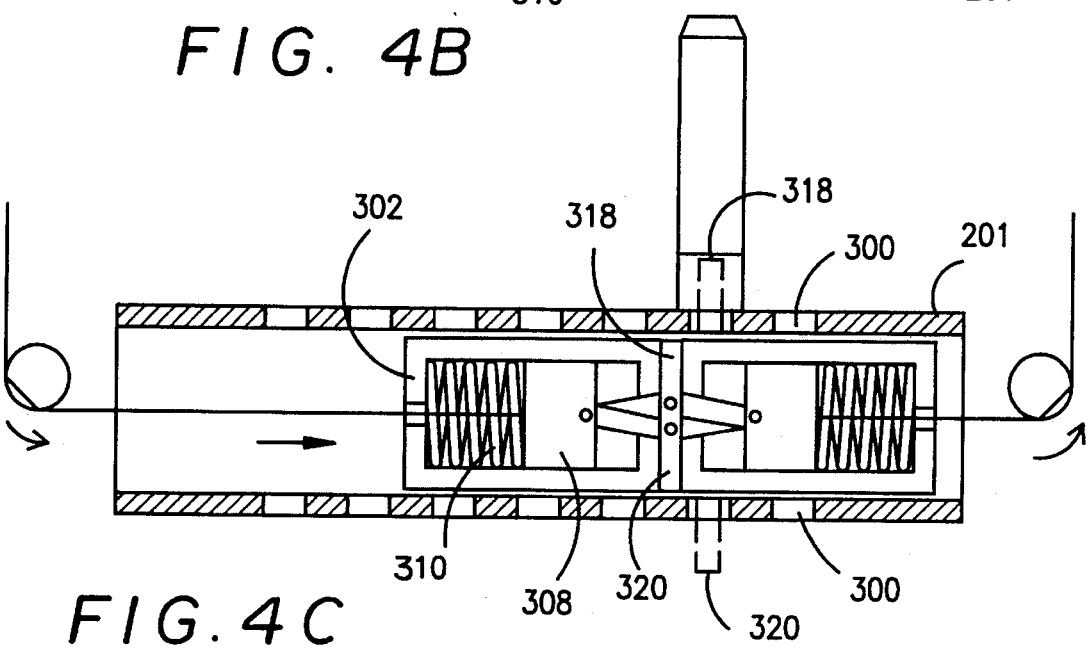

FIGS. 4A, 4B, and 4C illustrate, in somewhat schematic form, a second embodiment of a traveler and a locking tab arrangement suitable for use in the present invention. In this embodiment, driven hub 201 is provided with a plurality of diametrically opposed rectangular slots 300 positioned to be in alignment with the driven sprockets 42 of the driven gearset 40. The internal traveler 302 in this embodiment is a cylindrical tube having cavities 304,306. A rotational coupling 308 is disposed in each cavity, and is biased inwardly by a compression spring 310. The rotational couplings 308 each have an end of a shifter cable 312 secured thereto by a cable cap/bearing assembly (not shown)

inserted into the rotational coupling. The ends of the shifter cable 312 pass through openings 314 at the lateral extents of the traveler 300, and extend through the interior of the compression springs 310. The cables will be rotationally decoupled from the traveler, as in the previous embodiment, in that the cable caps securing the cable to the rotational couplings will be free to rotate relative to the rotational couplings.

At the inner ends of the rotational couplings 308 are four scissors links 316, with two pinned to each of the two rotational couplings. Of the two links pinned to each coupling, one is pinned at an end opposite the end pinned to the coupling end to an upper locking tab 318, and one is pinned at its opposite end to a lower locking tab 320. As a result, two upper links are pinned to each other at upper locking tab 318, and two lower links are similarly pinned to each other.

As shown in FIG. 4A, the locking tabs 318, 320, are in their extended position, extending through one of the slots 300, and into engagement with one of the driven sprockets 42. When in this position, the tabs engage diametrically opposed sprocket notches 48, much in the same manner as do the fixed tabs in the FIG. 3 embodiment. The tabs 318, 320, are rotated by the sprocket 42, and the tabs in turn engage the hub and rotate the hub to drive a driven shaft sprocket gear, as in the previous embodiment.

In changing speeds, the tabs 318, 320, are retracted from engagement with the driven sprocket 42 by pulling simultaneously, as will be described later, on both of the cables 312. This pulls the rotational couplings apart, overcoming the inward biasing forces of the compression springs, which causes scissors links 316 to pull downwardly on upper tab 318 and to pull upwardly on lower tab 320, as can be seen in FIG. 4B. This causes the tabs to retract substantially to a position in which the ends of the tabs are flush with, or are retracted slightly inside of, the outer surface of the traveler 302.

As shown in FIG. 4C, the speed change is effected by laterally moving the traveler 302 while the tabs are retracted. This is accomplished by applying an additional lateral force in a desired direction, while also maintaining the initial evenly divided pulling forces used to retract the tabs, to move the traveler in the desired direction. Once the tabs are moved into alignment with a desired driven sprocket, the force used to move the traveler laterally is ceased, and then the opposing pulling forces used to retract the tabs are released. This allows the compression springs to push the rotational couplings 308 back toward the center of the traveler, and causes the tabs to protrude through another pair of rectangular slots and into driving engagement with another driven sprocket, as shown in broken lines in FIG. 4C.

An indexing system identical to that described with respect to the fixed tab traveler in FIG. 3 may be used with the retractable tab traveler assembly depicted in FIGS. 4A, 4B, and 4C. As used with this retractable tab embodiment, the traveler 302 moves laterally until the ball engages the next bore along the hub, at which point the application of lateral force moving the traveler is ceased by the rider. Then, the equal and opposed forces pulling the rotational couplings 308 against the compression springs 310 are released, permitting the compression springs to push laterally inwardly on the links 316, and to thus allow the upper and lower locking tabs 318, 320, to protrude through the traveler 302 and through an adjacent pair of opposed rectangular slots 300 to engage an adjacent driven gear. Indexing for either of the two above-described embodiments may be provided for at the shifter mechanism instead of at the hub/traveler, if desired, by providing suitable stops for the positions of a shift lever corresponding to the positioning of a locking tab wherein the locking tab is aligned with each of the driven gears.

The use of a retractable tab assembly may prove to be advantageous in certain conditions, in that there is no requirement to use either spacers between the driven sprockets 42, or to use driven sprockets that have reduced cross-sectional thicknesses at their centers to create a recess into which a locking tab can move. With the retractable feature of the locking tab, it will be impossible for the tabs to engage more than one driven sprocket at the same time, thus obviating the need to provide recesses or neutral zones between sprockets.

Figure 5A:
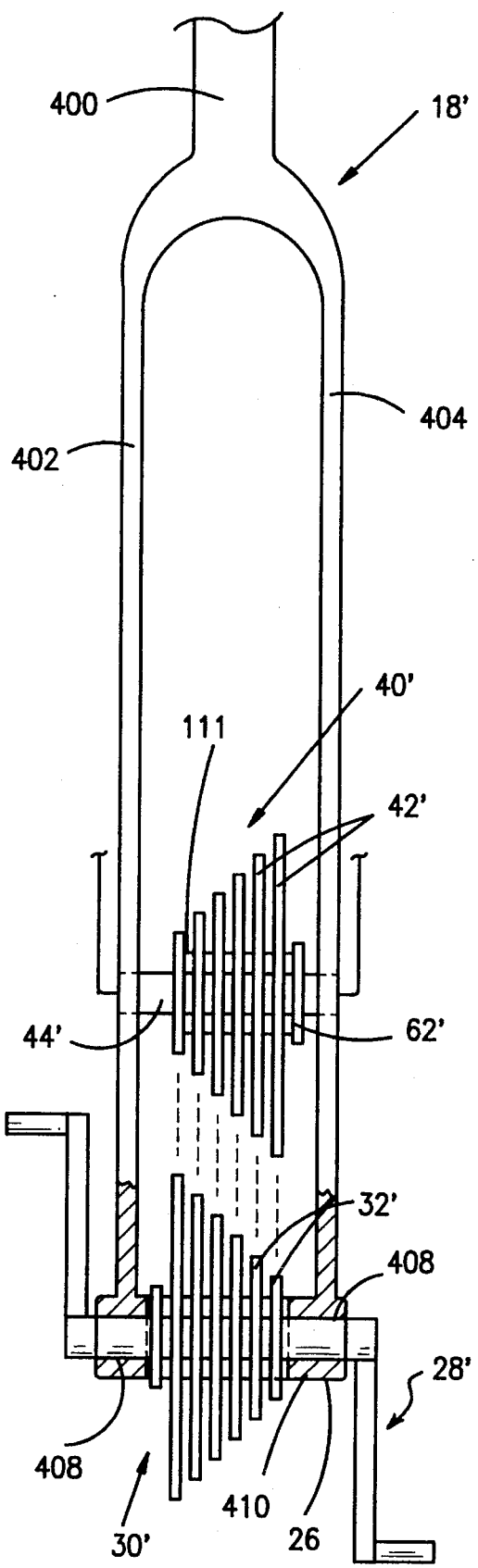
FIGS. 5A and 5B are elevation views of two alternative embodiments of the present invention which employ a forked seat tube on the bicycle frame.
Figure 5B:
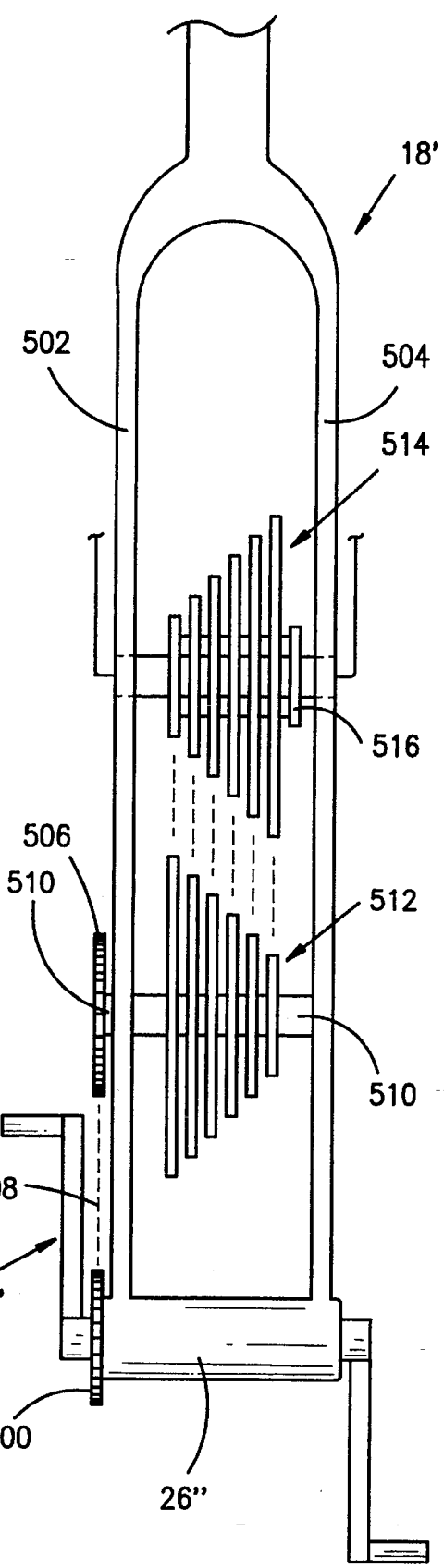
Figure 6:
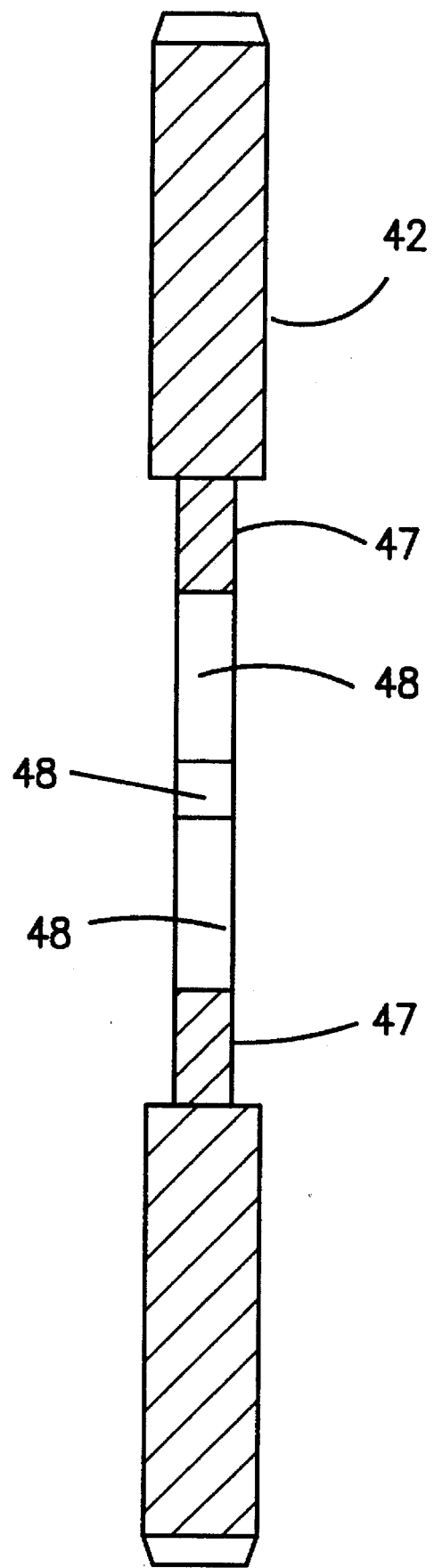
FIG. 6 is a sectional view of a preferred embodiment of one of the driven gears, depicting the reduced thickness portion of the gear at an inner radial portion thereof.

FIGS. 5A and 5B are elevation views of alternative preferred embodiments of the present invention in which the standard single pole seat tube 18 is replaced by a forked seat tube 18'. An upper portion 400 of this seat tube 18' is a single tube extending downwardly from the seat, and to which frame members 16, 20 are secured. Below that position, seat tube 18' splits into left and right lateral forks 402, 404, that extend downwardly to be joined to frame members 14, 22 (FIG. 1) at hub 26. In the embodiment shown in FIG. 5A, the hub 26 itself is also modified such that, instead of being a cylindrical tube extending across substantially the entire width of the bicycle frame, the hub has two sleeves 408 having cylindrical openings therethrough at the bottom of left and right forks 402, 404, and has a frame member 410 forming a box around driving gearset 30'.

In this embodiment, the drive sprockets 32' of driving gearset 30' are affixed to the pedal/crank assembly 28' at a center portion thereof, between the two hub sleeves 408. These drive sprockets drive a set of driven sprockets 42' in essentially the same manner as do the drive sprockets in the embodiment illustrated in FIG. 2 and described above, and the main difference is in the positioning of the gear pairs within a fork on the seat tube 18'. Either of the traveler and locking pin configurations discussed above would be suitable for use in this embodiment.

Driven shaft sprocket gear 62' is also disposed at one end of the driven gearset 40' within the confines of the forks 402, 404, but may alternatively be positioned outside the forks attached to a driven hub 44' extension member (not shown). Driven hub 44' in this embodiment is preferably secured to or through forks 402, 404, by bearing structures or the like, enabling the hub 44' to rotate freely relative to the structure to which it is mounted. This may be effected by using a separate bracket (not shown) clamped to the forks of the seat tube 18', or the seat tube itself may be designed and constructed to provide an integral mounting structure.

The embodiment shown in FIG. 5B also employs a forked seat tube 18', but in this embodiment, the hub 26" is substantially identical to a standard bicycle hub. A primary drive gear 500 is fixed to the pedal and crank assembly 28", which is in turn coupled to driving gearset drive gear 506 by sprocket chain 508. Driving gearset drive gear is fixedly mounted on drive shaft 510 at the exterior of fork 502, with the sprockets of driving gearset 512 also being fixedly mounted to drive shaft 510, but being disposed between the forks 502, 504. Drive shaft 510 is mounted to the two forks 502, 504 of seat tube 18' either by separate bracket, or through fixtures integral with the seat tube.

Above driving gearset 512 between the forks of seat tube 18' is a driven gearset 514 substantially identical in configuration to the driven gearset illustrated in FIG. 5A. Again, either of the described and illustrated traveler and locking tab embodiments will be suitable for use in this embodiment.

As the pedal/crank assembly is turned by the rider of the bicycle, primary drive gear 500 is rotated, pulling drive chain 508, and rotating driving gearset drive gear, drive shaft 510, and driving gearset 512. The driven sprocket of the selected gear pair rotationally couples the driven hub to the driven hub sprocket gear 516, which itself is coupled to a rear wheel sprocket gear by a rear wheel drive chain.

Figure 7:
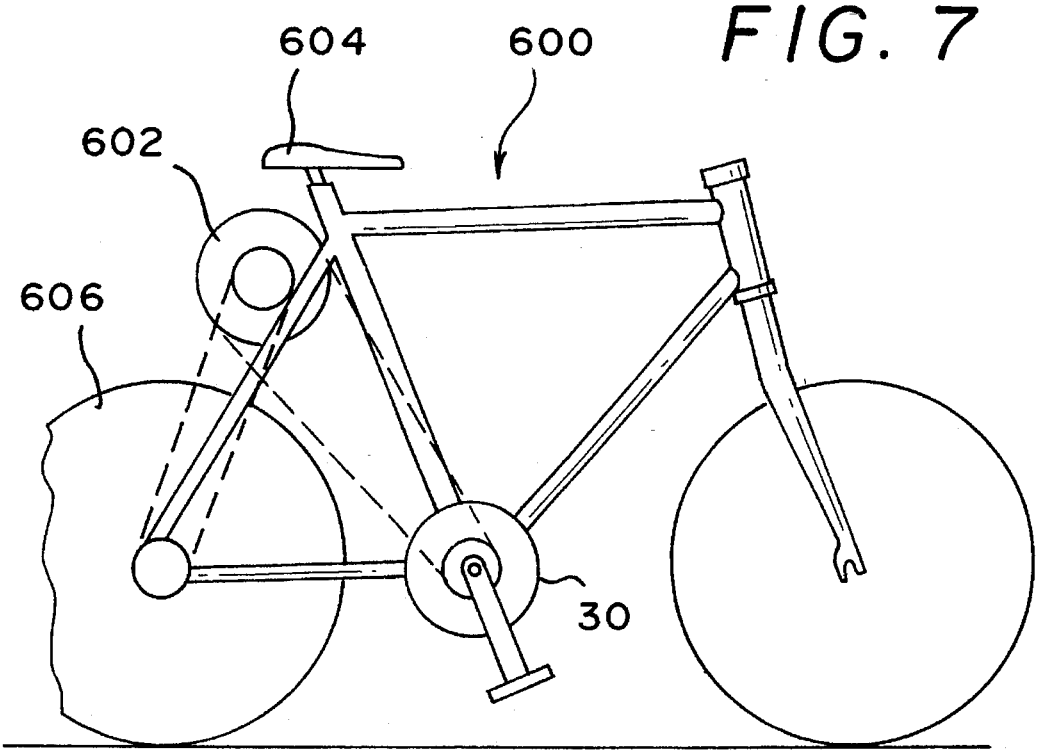
FIG. 7 is a substantially schematic side view of a bicycle having a representation of an alternative preferred positioning of the driven gearset attached to the frame of the bicycle.

FIG. 7 is a schematic illustration of a bicycle frame 600 in which the driven gearset 602 is mounted at a position under and to the rear of the seat 604, and above rear wheel 606. In all operational aspects, this speed change mechanism 608 operates substantially identically to the speed change mechanism 24 illustrated in FIGS. 1 and 2.

Figure 8:
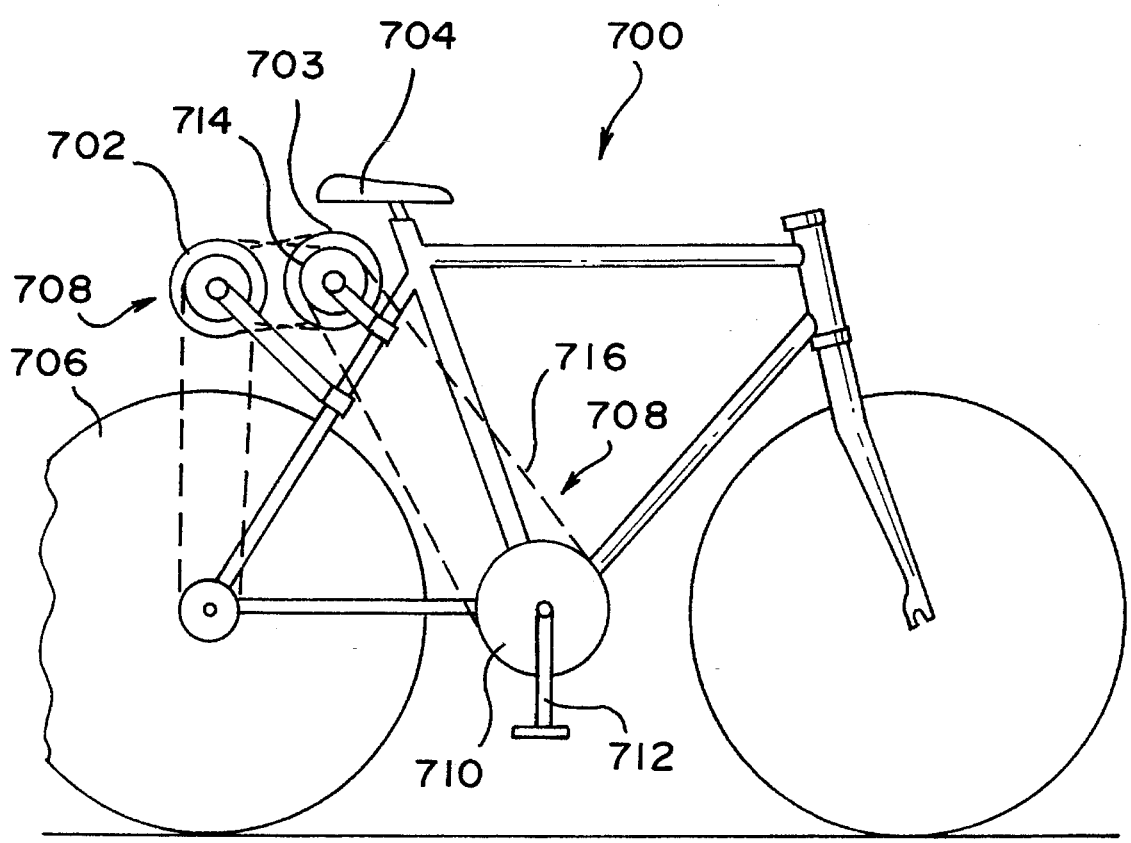
FIG. 8 is a substantially schematic side view of a bicycle having a representation of an alternative preferred positioning of the driving and driven gearsets attached to the frame of the bicycle.

FIG. 8 is a schematic illustration of a bicycle frame 700, in which both the driven and driving gearsets, 702, 703, respectively, are mounted at a position under and to the rear of seat 704, and above rear wheel 706. The speed change mechanism 708 in this embodiment operates in a manner similar to that shown in FIG. 5B. A primary drive gear 710 is provided at the pedal/crank assembly 712, and is coupled to a driving gearset drive gear 714 by a primary drive chain 716. This coupling provides the power input to driving gearset 703 when the rider pedals the bicycle, and the driving and driven gearsets produce the desired gear ratio to yield the overall desired drive ratio at the rear wheel of the bicycle.

Figure 9A:
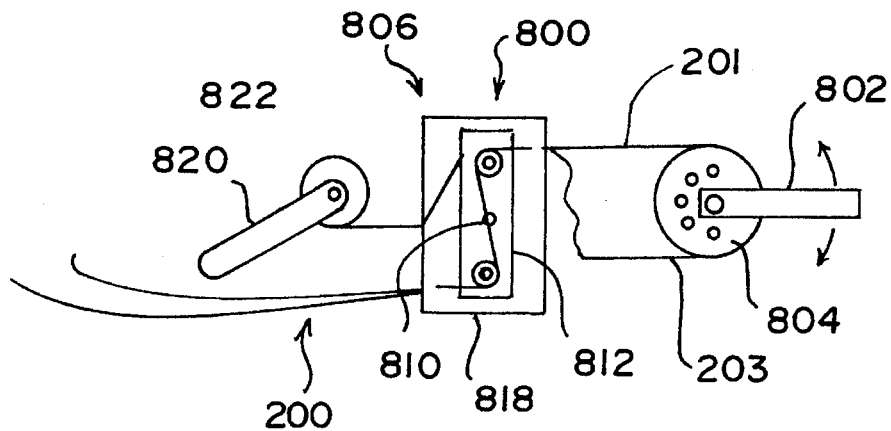
FIGS. 9A, 9B, and 9C are substantially schematic illustrations of the shifting subassembly of the present invention.
Figure 9B:
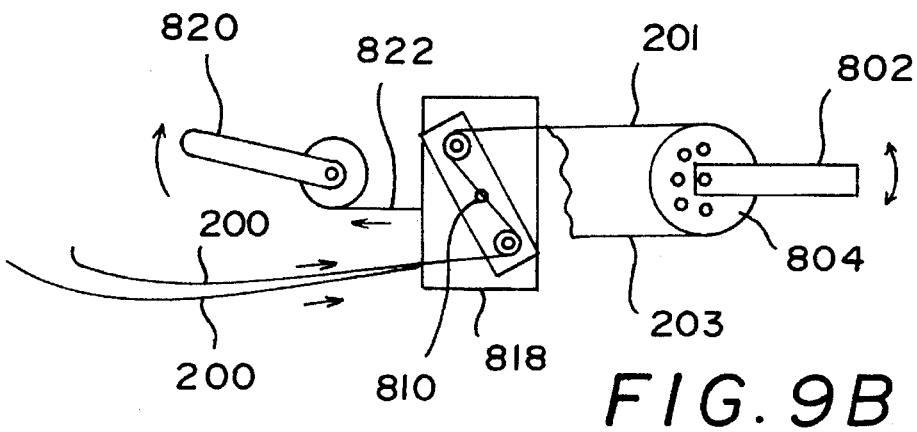
Figure 9C:
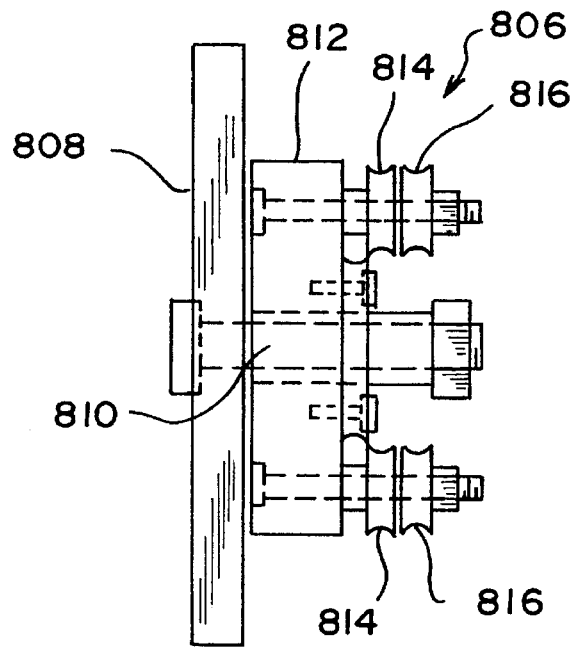

FIGS. 9A, 9B and 9C are substantially schematic representations of a shifting mechanism 800 that would be suitable for use with the present invention, and even more especially for use with the retractable tab traveler embodiment shown in FIGS. 4A, 4B, and 4C. The proximal end of cables 200, near the shifting lever, are shown in these figures, whereas the distal ends of the cables are shown, for example, in FIGS. 2, 3 and 4, coupled to the traveler mechanism. In the FIG. 9 embodiment, shifting mechanism 800 includes a shifter lever 802 and a shifter pulley 804. The proximal ends 201, 203 of cables 200 are affixed to shifter pulley 804.

In between the location of shifter pulley 804 and the traveler assembly 100, along the path of the shifting cable run, is provided a shifting cable clutch 806, made up of a mounting plate 808, a center post 810 extending perpendicularly from the mounting plate, a clutch plate 812 pivotably secured to the center post, and a first and a second pair of sheaves 814, 816, respectively, mounted on the clutch plate. The cable clutch 806 is disposed within a clutch housing 818, and a clutch lever 820 disposed outside housing 818 is coupled to the clutch plate 812 by actuating cable 822. Actuating cable 822 is connected to clutch plate 812 at a position spaced apart from center post 810, so that application of and release of a pulling force on clutch lever 820 and actuating cable 822 will result in clutch plate 812 pivoting about center post 810 in the manner described below. The housing 818 may be mounted on the bicycle frame at the location shown in FIG. 1, or at any other location on the frame deemed suitable. Clutch lever 820 is preferably mounted within easy reach of the rider of the bicycle, for example, at one of the locations where derailleur shift levers are now commonly mounted to the bicycle frame.

In operation, the shifting cable clutch 806 is operated to provide the tension on the cables that pulls the rotational couplings in the hub outwardly against the biasing force of the compression springs, to retract the locking tabs. The clutch lever is normally in a neutral position (FIG. 9A) when the bicycle is in operation, and provides substantially no tension on the cables. The cables extend from the driven hub and pass into the cable housing and around the sheaves, and back out of the cable housing, where they are connected to the shifter pulley. When the bicycle rider desires to change speeds (shift gears), the rider moves clutch lever 820 from the neutral position to an active position (FIG. 9B), pulling on actuating cable 822. The actuating cable in turn causes the clutch plate to pivot about the center post, with the clutch plate and the sheaves pulling or applying tension to the two cables 200 extending into the hub. This action moves the retractable locking tabs from the position shown in FIG. 4A to the position shown in FIG. 4B.

With the clutch lever 820 still in the active position, the rider then operates shifter lever in a desired direction, which pulls one of the cables 200 and releases tension on the other cable. This results in the cables forcing the traveler 100 to move in the desired direction. Once the indexing mechanism has caused the traveler to stop at an adjacent operating position, the rider will release the shifter lever, and then move the clutch lever from the active position back to the neutral position, and the retractable locking tabs will reemerge through the hub and into driving engagement with the driven sprocket with which it has been brought into alignment. The ultimate drive ratio of the bicycle will thus be changed by virtue of using a different gear pair than was employed prior to shifting.

A shifting mechanism that avoids the use of a clutch and a second shifting lever is also envisioned for use with the retractable-tab embodiment of the present invention. The initial movement of the scissors links in retracting the tabs may be accomplished by employing a shift lever that operates in two modes. In such a system, a first mode could be an extending or a contracting movement of the shift lever along its longitudinal axis, wherein the shifter cables will be coupled to the lever in such a manner that this extending or contracting movement will apply the necessary tension to operate the scissors links to retract the pin. The shifting lever will then be rotated about a perpendicular axis, in a manner similar to that shown in FIGS. 9A–C, to move the traveler laterally in the hub. Once the traveler is in the desired position, the extending or contracting movement of the shift lever is reversed to release the tension on the shifter cable, to allow the tabs to extend through the hub into engagement with a desired driven sprocket.

Alternative designs for the mechanism used to retract the tabs are also contemplated. It may be possible to eliminate one of the compression springs in the scissors link embodiment shown in FIGS. 4A–C, in that the scissors links will cause the tabs to retract even if only one pair of the scissors links is moved laterally. Further, it may be possible to eliminate the scissors links entirely in favor of a system that will operate to retract the tabs in some other way. For example, a solid element, such as a disc, attached to the traveler could be provided, wherein, in one orientation, the element2 would hold the locking tabs in their extended position to engage the desired sprocket. The tabs would be retracted by rotating the element to another orientation, and the element would be coupled to the tabs, as by slots in the disc element cooperating with flanges at the inner ends of the tabs, such that the rotation of the element would effect a retraction of the tabs inside the hub. The traveler is then moved laterally within the hub to a new desired position. The rotation is then reversed, to move the element back to its original orientation, to cause the tabs to again protrude through the hub. The rotation of the disc element may be effected by attaching a cable thereto extending around a circumferential track at the outer radial extent of the disc. The disc would rotate about an axis perpendicular to the longitudinal axis of the hub.

The shifting mechanism 800 to be used with the fixed tab traveler construction shown in FIGS. 3A, 3B, and 3C may preferably employ the same shifter lever 802 and shifter pulley 804. However, because the fixed tab system does not require an initial tension evenly applied to the cables at both sides of the traveler, the entire clutch mechanism can be dispensed with. The shifting to engage an adjacent gear pair is accomplished simply by moving the shifter lever in a direction to pull one of the cables in the desired direction.

It will be apparent to those skilled in the art that various modifications and variations can be made in the structure of the speed changing mechanism of the present invention without departing from the scope or spirit of the invention. Thus, it is intended that the present invention cover the modifications and variations of the invention provided they come within the scope of the appended claims and their equivalents.

What is claimed is:

1. A speed change mechanism capable of effecting speed changes during both kinetic and static conditions comprising:

a bicycle frame, said bicycle frame having a front wheel and a rear wheel connected thereto;

a driving gearset comprising a plurality of driving gears fixedly secured to a drive shaft;

a driven gearset comprising a plurality of driven gears rotatably mounted around an exterior surface of a driven hub, and disposed laterally along a central axis of said hub;

wherein said shaft of said driving gearset and said driven hub of said driven gearset are retained in position along parallel axes, and wherein each of said plurality of driven gears has a different one of said plurality of driving gears associated therewith;

said associated driven gears and driving gears forming a plurality of gear pairs;

a plurality of gear pair chains, each of said plurality of gear pairs being operatively coupled by an associated one of said plurality of gear pair chains;

said driving gears and said driven gears making up said gear pairs being so constructed and arranged to provide a different input to output drive ratio for each of said plurality of gear pairs;

a traveler disposed in an interior of said driven hub, said traveler having means for engaging a selected driven gear to rotationally couple said selected driven gear to said driven hub, said traveler and said hub being so constructed and arranged to allow said traveler to move laterally within said hub to engage each of said driven gears;

said driven gear engaging means being so constructed and arranged to engage only one driven gear of said plurality of driven gears at a time;

at least one cable operatively coupled to said traveler for moving said traveler laterally within said hub;

a shifter mechanism coupled to said cable for selectively applying and releasing tensile forces on said cable;

a power input mechanism for applying power to and rotating said driving gears; and a power output member operatively coupled to said driven hub and rotatable therewith.

2. A speed change mechanism as recited in claim 1, further comprising a pedal and crank assembly disposed at a position intermediate said front wheel and said rear wheel at a lower portion of said bicycle frame.

3. A speed change mechanism as recited in claim 2 wherein said pedal and crank assembly is mounted to said drive shaft to which said driving gearset is fixedly secured.

4. A speed change mechanism as recited in claim 3 wherein said pedal and crank assembly is mounted to a primary drive shaft having a primary drive gear fixedly secured thereto, and wherein said primary drive gear is operatively coupled by a primary drive chain to a driving gearset drive gear fixedly mounted on said drive shaft to which said driving gearset is secured.

5. A speed change mechanism as recited in claim 3 wherein said driven gearset and said driven hub are mounted to said frame by a bracket, and wherein said driven gearset and said driven hub are positioned above said driving gearset in front of a seat tube portion of said bicycle frame.

6. A speed change mechanism as recited in claim 3 wherein said driven gearset and said driven hub are mounted to said frame by a bracket, and wherein said driven gearset and said driven hub are positioned under and to the rear of a seat disposed on said bicycle frame, and are positioned above said rear wheel.

7. A speed change mechanism as recited in claim 1 wherein said driven gear engaging means comprises a pair of diametrically opposed locking tabs protruding radially outwardly from said traveler, and wherein each of said driven gears has at least two diametrically opposed notches at a central portion thereof sized to receive said locking tabs therein.

8. A speed change mechanism as recited in claim 7 wherein said locking tabs are retractable from a first position at which the locking tabs protrude through the driven hub, and a second position at which said locking tabs are contained within the driven hub, and wherein said driven hub has openings along a lateral axis of said hub to permit said locking tabs to protrude through said driven hub at least at locations in alignment with said driven sprockets.

9. A speed change mechanism as recited in claim 1 wherein said power output member is also operatively coupled to a rear wheel drive gear disposed at a hub of a rear wheel of said bicycle, and wherein said rear wheel drive gear is so constructed and arranged to transfer power to said rear wheel when said rear wheel drive gear is rotated.

10. A speed change mechanism as recited in claim 9 wherein each of said driven gears of said driven gearset and each of said driving gears of said driving gearset is a sprocket gear, and wherein said rear wheel drive gear is a sprocket gear, and wherein said gear pair chains are sprocket chains, and wherein said operative coupling of said power output member to said rear wheel drive gear is effected by a sprocket chain.

11. A speed change mechanism as recited in claim 1, wherein said bicycle frame includes a seat tube having a first and a second fork extending from adjacent an upper end to a lower end, said first and second forks being spaced apart in substantially parallel orientation, and wherein said driven gearset and said driven hub are mounted to said seat tube to be disposed between said first and second forks.

12. A speed change mechanism as recited in claim 11 wherein said driving gearset and drive shaft are also mounted to said seat tube at a position between said first and second forks.

13. A speed change mechanism as recited in claim 1 wherein said driven hub and said traveler include means for indexing the lateral position of the traveler within said driven hub.

14. A speed change mechanism as recited in claim 13 wherein said indexing means comprises a plurality of bores disposed in said hub, and a radially outwardly biased ball of a larger diameter than a diameter of said bores disposed in said driven hub, said traveler being positioned within said driven hub such that said ball will successively engage said bores as said traveler moves laterally within said driven hub.

15. A speed change mechanism as recited in claim 1 wherein said driving gearset comprises at least three driving gears, and wherein said driven gearset comprises an equal number of driven gears.

16. A speed change mechanism as recited in claim 1, wherein said driven gearset and said driven hub are mounted to said bicycle frame by a bracket, and wherein said driven gearset and said driven hub are positioned substantially under and substantially to the rear of a seat disposed on said bicycle frame, and are positioned above said rear wheel.

17. A speed change mechanism as recited in claim 16, wherein said driving gearset and said drive shaft are also mounted to said bicycle frame by a bracket, and wherein said driving gearset and said drive shaft are positioned substantially under and substantially to the rear of a seat disposed on said bicycle frame, and are positioned above said rear wheel.

* * * * *